(12) United States Patent
Hibino et al.

(10) Patent No.: US 9,790,848 B2
(45) Date of Patent: Oct. 17, 2017

(54) ENGINE

(71) Applicant: Yanmar Co., Ltd., Osaka-shi (JP)

(72) Inventors: Mitsuhiro Hibino, Osaka (JP); Kazuki Maetani, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 14/388,774

(22) PCT Filed: Jan. 24, 2013

(86) PCT No.: PCT/JP2013/000345
§ 371 (c)(1),
(2) Date: Sep. 26, 2014

(87) PCT Pub. No.: WO2013/145514
PCT Pub. Date: Oct. 3, 2013

(65) Prior Publication Data
US 2015/0053185 A1 Feb. 26, 2015

(30) Foreign Application Priority Data

Mar. 28, 2012 (JP) .................................. 2012-073800

(51) Int. Cl.
*F02B 47/08* (2006.01)
*F02B 37/013* (2006.01)
(Continued)

(52) U.S. Cl.
CPC ........... *F02B 37/013* (2013.01); *F01M 11/03* (2013.01); *F02B 29/04* (2013.01);
(Continued)

(58) Field of Classification Search
CPC ........... F02M 25/0707; F02M 25/0737; F02M 25/0731; F02M 25/0735; F02M 25/0728
(Continued)

(56) References Cited

U.S. PATENT DOCUMENTS 6,460,519 B1 * 10/2002 Pierpont ............... F02B 37/004
123/568.12
2003/0015182 A1 * 1/2003 Gokan .................. B63B 35/731
123/559.1
(Continued)

FOREIGN PATENT DOCUMENTS

DE 10 2009 052 209 A1 5/2011
JP 56-039821 4/1981
(Continued)

OTHER PUBLICATIONS

Extended European Search Report; European Patent Application No. 13769144.0; Oct. 15, 2015; 6 pages.
(Continued)

*Primary Examiner* — Jacob Amick
*Assistant Examiner* — Charles Brauch
(74) *Attorney, Agent, or Firm* — Sterne, Kessler, Goldstein & Fox P.L.L.C.

(57) ABSTRACT

A marine engine includes a first turbocharger, a first intercooler, a second turbocharger, a second intercooler, an oil filter, and a top cover. The first turbocharger and the second turbocharger supply air by using an exhaust gas. The first intercooler and the second intercooler cool gases having passed through the turbochargers, respectively. The top cover is a cover arranged in an upper region of the marine engine. These devices are arranged so as not to overlap one another when seen in the thickness direction of the top cover.

4 Claims, 4 Drawing Sheets

(51) Int. Cl.
F02B 29/04 (2006.01)
F01M 11/03 (2006.01)
F02B 37/00 (2006.01)
F02B 77/11 (2006.01)

(52) U.S. Cl.
CPC ........ *F02B 29/0412* (2013.01); *F02B 37/004* (2013.01); *F02B 77/11* (2013.01); *F01N 2590/02* (2013.01); *Y02T 10/144* (2013.01); *Y02T 10/146* (2013.01)

(58) Field of Classification Search
USPC .................................................... 123/568.12
See application file for complete search history.

(56) References Cited

U.S. PATENT DOCUMENTS

| 2003/0150408 | A1 | 8/2003 | Roithinger | |
| 2005/0235951 | A1* | 10/2005 | Weber | F01L 13/0015 123/299 |
| 2011/0308486 | A1 | 12/2011 | Dorothy | |
| 2012/0003082 | A1* | 1/2012 | Niwa | F02B 39/005 415/180 |

FOREIGN PATENT DOCUMENTS

| JP | 56-106018 A | 8/1981 |
| JP | S59 86316 | 6/1984 |
| JP | 60-101223 A | 6/1985 |
| JP | 64-003231 A | 1/1989 |
| JP | 11-315725 B2 | 11/1999 |
| JP | 2003-035155 A | 2/2003 |
| JP | 2003-239752 A | 8/2003 |
| JP | 2006-090205 A | 4/2006 |
| JP | 2010-059807 A | 3/2010 |
| JP | 2011-099332 A | 5/2011 |
| JP | 2011-163201 A | 8/2011 |
| WO | WO 91/19086 A1 | 12/1991 |

OTHER PUBLICATIONS

International Search Report; International Application No. PCT/JP2013/000345; Apr. 16, 2013.

* cited by examiner

ENGINE

BACKGROUND

Technical Field

The present invention relates to a marine engine including two turbochargers and two intercoolers.

Background Art

A conventionally known configuration of an engine of a vehicle, a ship, or the like, is a configuration including two turbochargers (two-stage turbocharging system). The two-stage turbocharging system causes a turbine of one turbocharger to rotate by using an exhaust gas discharged from a cylinder, and thereby compresses air and sends the air to the cylinder side. The other turbocharger further compresses the air having been compressed by the one turbocharger, and then sends the air to the cylinder. As a result, the flow volume of air supplied to the cylinder can be increased, which leads to improvement in engine output.

Since the air compressed by the turbocharger has a high temperature, the density decreases (the mass flow rate decreases). This is why an intercooler for cooling high-temperature air is arranged after the turbocharger. Each of Patent Documents 1 to 3 discloses a two-stage turbocharging system including intercoolers (two intercoolers in total) that are arranged after one turbocharger and the other turbocharger, respectively. In the disclosures of the Patent Documents 1 to 3, an engine for use in an automobile, an engine for use in construction equipment such as a power shovel, an engine for use in an aircraft, and the like, are mentioned as objects to which the two-stage turbocharging system is applied.

Another known configuration of the two-stage turbocharging system is a configuration including two turbochargers and one intercooler, in which air having passed sequentially through the two turbochargers is cooled by the one intercooler. The two-stage turbocharging system of this type is adopted in, for example, an engine (marine engine) mounted in a ship.

PRIOR-ART DOCUMENTS

Patent Documents

Patent Document 1: Japanese Patent Application Laid-Open No. 2011-99332
Patent Document 2: Japanese Patent Application Laid-Open No. 2011-163201
Patent Document 3: Japanese Patent No. 3953636

SUMMARY OF THE INVENTION

Problems to be Solved by the Invention

In the engines for use in construction equipment, automobiles, and the like, the intercooler is typically arranged not near a cylinder block but at some distance from the cylinder block. This renders arrangement of the turbochargers and the intercoolers less problematic.

In a marine engine, on the other hand, a turbocharger and a intercooler are arranged near a cylinder block. Therefore, it is necessary to consider arrangement of the turbocharger and the intercooler in making a layout of the marine engine. In the marine engine, moreover, a layout is desirably made in consideration of, for example, the following points. Since a ship may sometimes include a plurality of marine engines that are arranged in parallel, a layout that provides a reduced size with respect to the direction in which the marine engines are arranged in parallel is preferred for the marine engine. Moreover, the marine engine may be sometimes arranged in a lower region of a hull, and therefore an operator has to work on an upper surface of the marine engine when performing a maintenance operation or the like. Thus, a layout that allows the operator existing on the upper surface to easily perform the maintenance operation is preferred for the marine engine.

The marine engine adopts the two-stage turbocharging system including only a single intercooler, as described above. If the two-stage turbocharging system including two intercoolers is adopted, making a layout is more difficult because of the increase in the number of devices.

The present invention has been made in view of the circumstances described above, and a primary object of the present invention is to provide a marine engine that enables facilitation of a maintenance operation while adopting a two-stage turbocharging system.

Means for Solving the Problems and Effects Thereof

Problems to be solved by the present invention are as described above, and next, means for solving the problems and effects thereof will be described.

In an aspect of the present invention, a marine engine having the following configuration is provided. The marine engine includes a first turbocharger, a first intercooler, a second turbocharger, a second intercooler, an oil filter, and a plate-like cover. The first turbocharger supplies air by using an exhaust gas. The first intercooler, into which a gas having passed through the first turbocharger flows, cools the gas whose temperature has been elevated in the first turbocharger. The second turbocharger, into which a gas having passed through the first intercooler flows, supplies air by using an exhaust gas. The second intercooler, into which a gas having passed through the second turbocharger flows, cools the gas whose temperature has been elevated in the second turbocharger. The oil filter filters an engine oil. The plate-like cover is a cover that covers a valve cover positioned above a cylinder head. The first turbocharger, the first intercooler, the second turbocharger, the second intercooler, and the oil filter are arranged so as not to overlap one another when seen in the thickness direction of the plate-like cover.

Accordingly, an operator working on the plate-like cover in performing the maintenance operation has easy access to the oil filter, the turbochargers, and the like, which need relatively frequent maintenance operations. Thus, facilitation of the maintenance operation can be improved.

Preferably, the marine engine is configured as follows. The oil filter is arranged in an end portion of the marine engine with respect to a crank axis direction, the end portion being opposite to a transmission-side end portion that is one end portion of the marine engine to which a transmission is connected.

In a ship installed with the marine engine, there is often a relatively large space on the side opposite to the side where the transmission is connected. The oil filter can be arranged with effective use of the space. The presence of the space makes replacement of the oil filter easy.

Preferably, the marine engine is configured as follows. The first turbocharger is arranged in the transmission-side end portion. The first intercooler, the second turbocharger, and the second intercooler are arranged side by side in a crank axis direction.

This makes it possible that the turbochargers and the like are positioned together to some extent, which can improve the facilitation of the maintenance operation in a case where the maintenance operation is performed sequentially on a plurality of the turbochargers and the like.

In the marine engine, an upper surface (of the marine engine) and a surface of the plate-like cover are at least partially identical, and when the height of the position of a bisector bisecting the distance between the upper surface and a bottom surface of the marine engine that is a surface thereof on the side opposite to the upper surface is defined as a reference height, all of the first turbocharger, the first intercooler, the second turbocharger, the second intercooler, and the oil filter are arranged higher than the reference height.

Since the turbochargers and the like are arranged in an upper region (near the plate-like cover) of the marine engine, the maintenance operation can be further facilitated. Delete if not applicable.

EMBODIMENT FOR CARRYING OUT THE INVENTION

Figure 1:
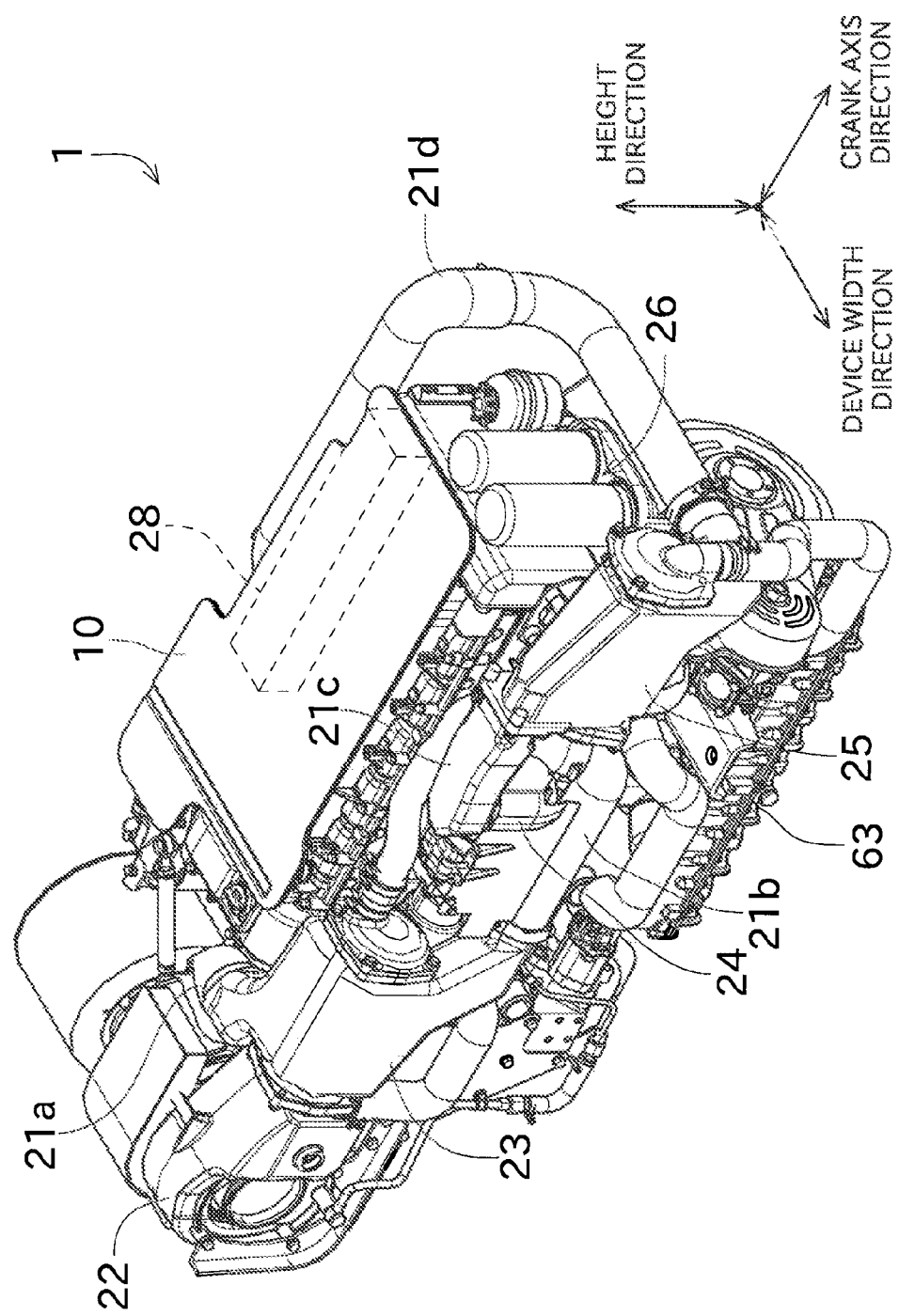
FIG. 1 A perspective view of a marine engine according to an embodiment of the present invention.
Figure 2:
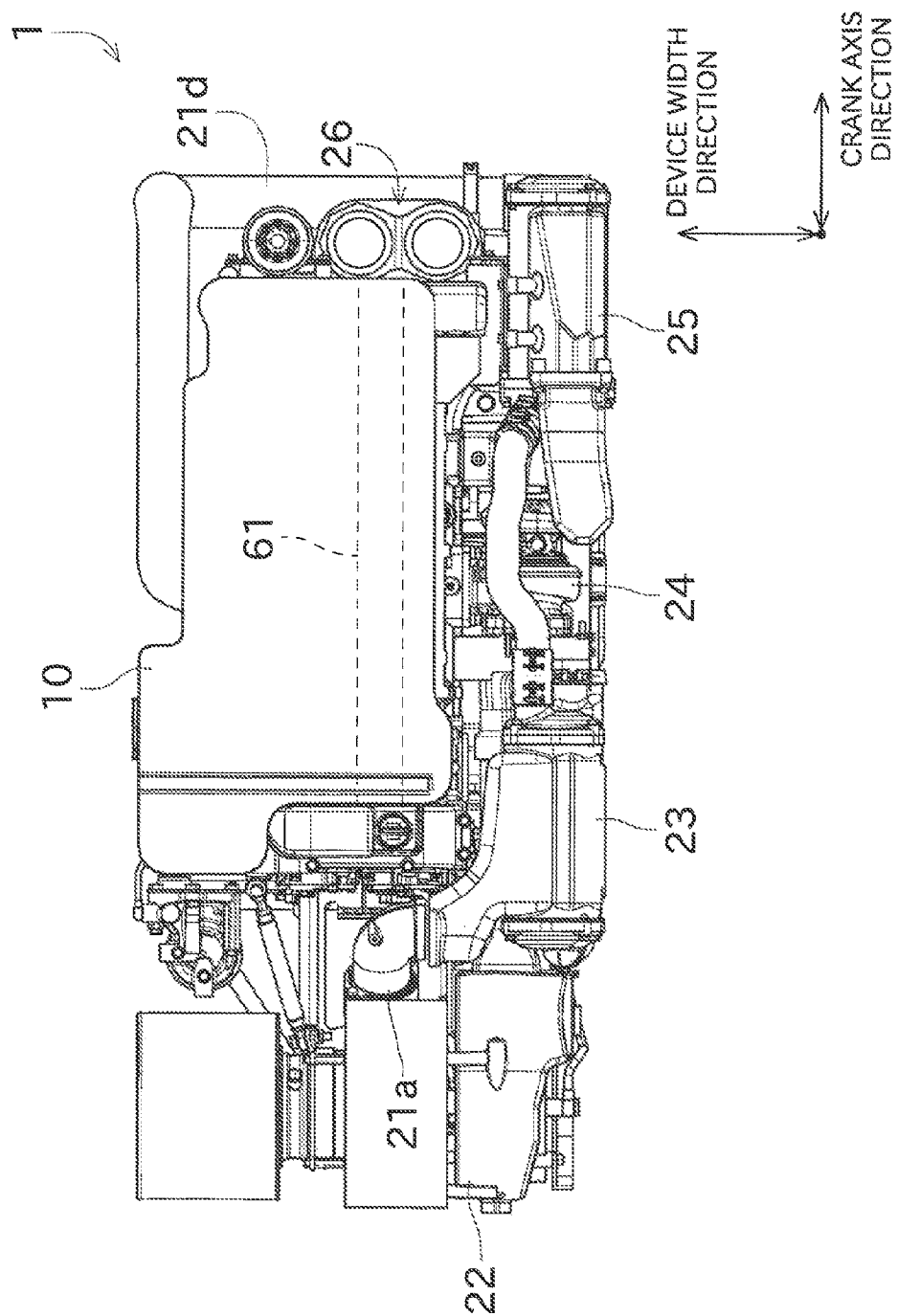
FIG. 2 A plan view of the marine engine.
Figure 3:
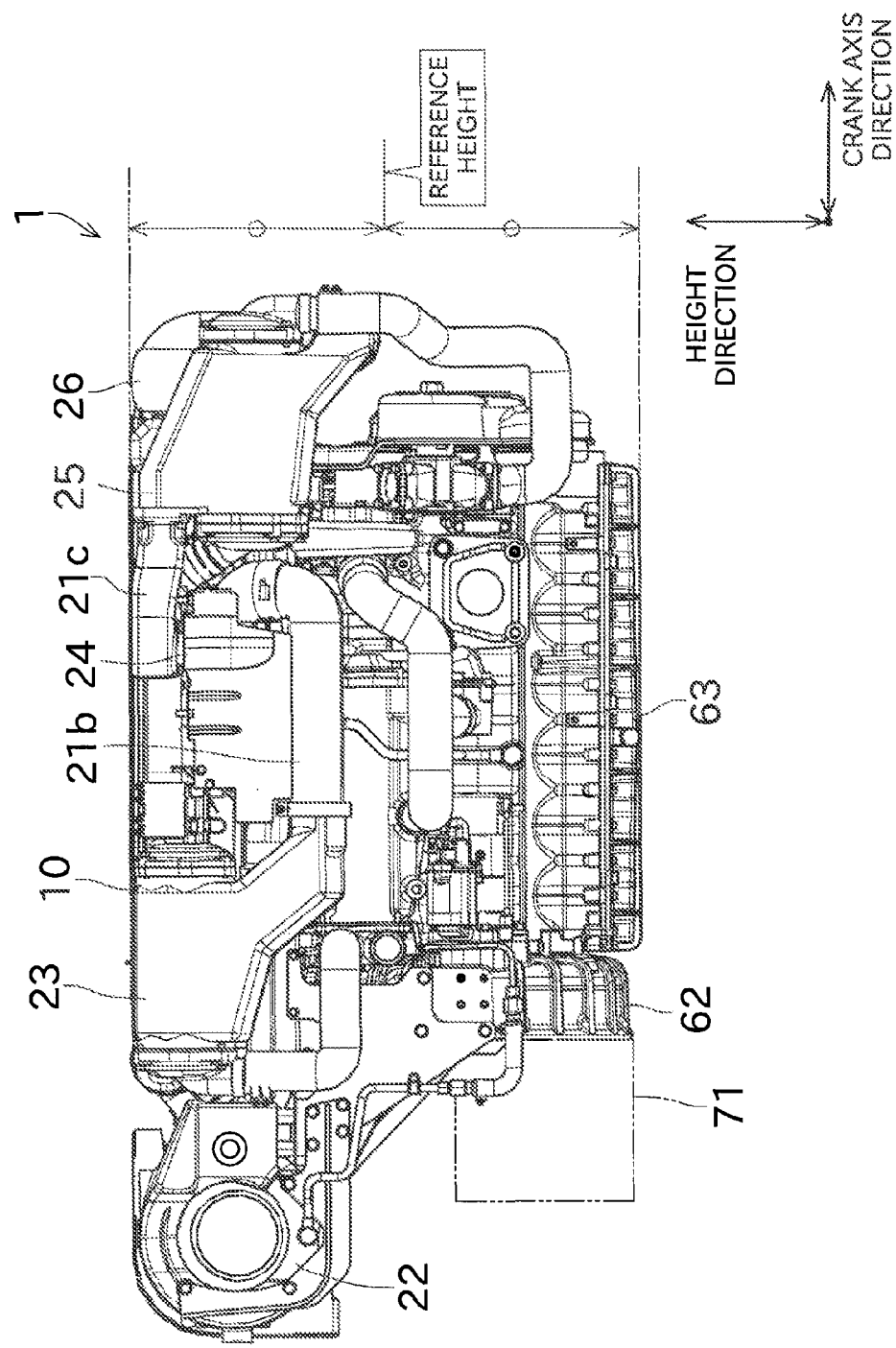
FIG. 3 A front elevational view of the marine engine.
Figure 4:
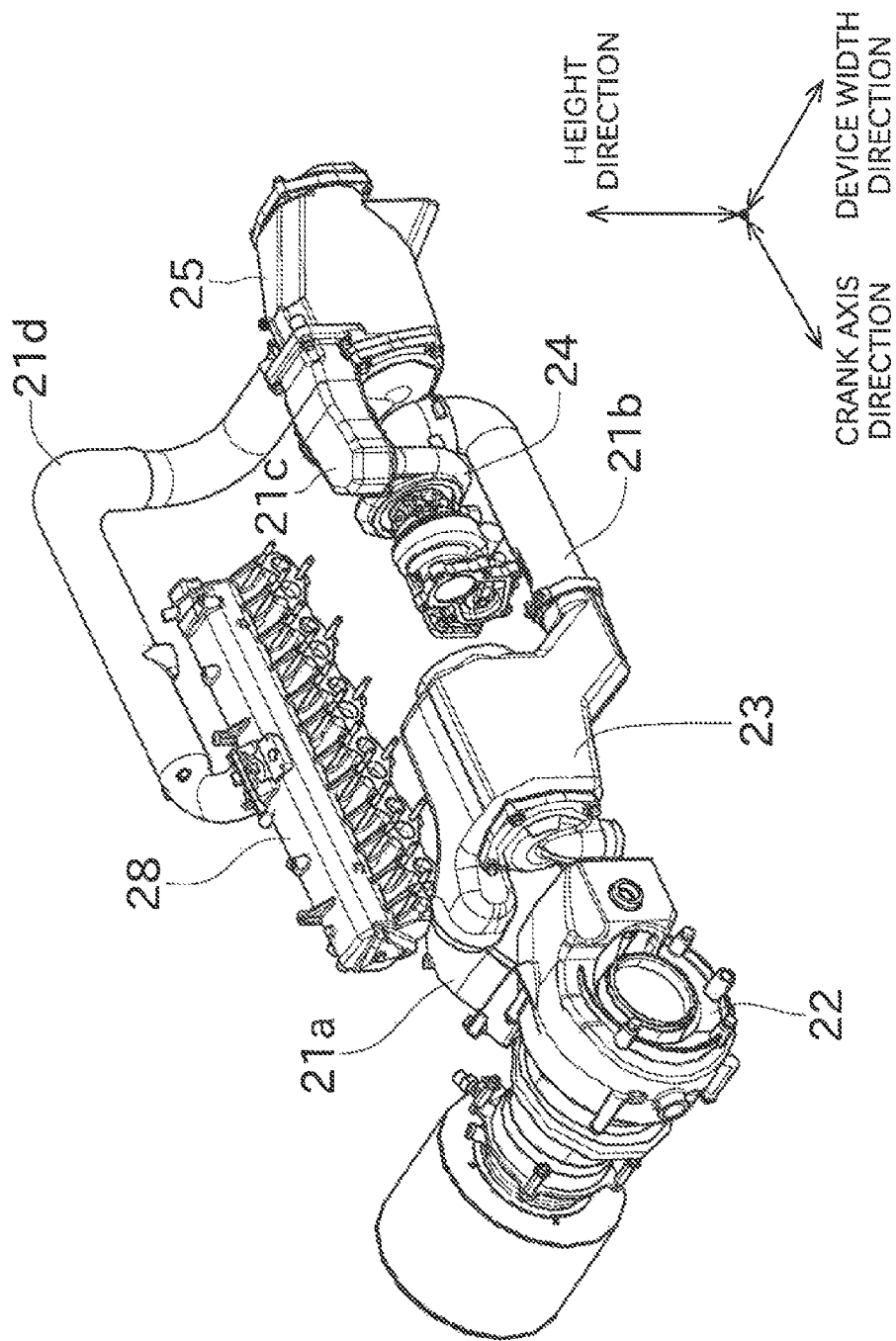
FIG. 4 A perspective view showing the positional relationship among devices of an air supply system.

Next, an embodiment of the present invention will be described with reference to the drawings. FIG. 1 is a perspective view of a marine engine 1. FIG. 2 is a plan view of the marine engine 1. FIG. 3 is a front elevational view of the marine engine 1. FIG. 4 is a perspective view showing the positional relationship among devices of an air supply system.

In the following description, the vertical direction of the marine engine 1 will be referred to as height direction, the longitudinal direction of a crankshaft 61 (see FIG. 2) of the marine engine 1 will be referred to as crank axis direction, and the direction perpendicular to both the height direction and the crank axis direction will be referred to as device width direction, as shown in FIG. 1. The top side of FIG. 1 (the side in which a top cover 10 which will be described later is arranged) with respect to the height direction is defined as the upper side.

The marine engine 1 of this embodiment is a diesel engine of in-board type that is mounted in a ship such as a pleasure boat. The marine engine 1 adopts a two-stage turbocharging system.

As shown in FIG. 1, etc., the marine engine 1 includes a top cover (plate-like cover) 10. The top cover 10 is in the shape of a flat plate, and arranged with its thickness direction parallel to the height direction. The shape of the top cover 10 is not limited to a flat plate shape, but the top cover 10 may be at least partially bent (or curved). A valve cover, a cylinder block, and the like, are arranged below the top cover 10.

As shown in FIG. 1, etc., the two-stage turbocharging system of the marine engine 1 includes a first turbocharger 22, a first intercooler 23, a second turbocharger 24, a second intercooler 25, and air supply pipes 21a to 21d that connect them.

The first turbocharger 22 includes a turbine and a compressor provided inside a cover and a housing. The turbine is configured to rotate by using an exhaust gas. The compressor is connected to a shaft to which the turbine is also connected, and configured to rotate along with rotation of the turbine. Rotation of the compressor enables the first turbocharger 22 to compress air and forcibly supply air. This configuration is able to, by using the exhaust gas, increase the flow volume of air supplied to a cylinder, and thus achieves an increased output of the marine engine 1. Air intake performed by the first turbocharger 22 causes rapid compression of air, which makes the temperature of the air high. This high-temperature air is sent out through the air supply pipe 21a to the first intercooler 23.

A plurality of cooling pipes through which sea water flows are arranged within a housing of the first intercooler 23. The air sent out from the first turbocharger 22 flows around the cooling pipes. Such a configuration enables the first intercooler 23 to cool the air sent out from the first turbocharger 22 by means of heat exchange between the air and the sea water. The air cooled by the first intercooler 23 is sent out through the air supply pipe 21b to the second turbocharger 24.

The second turbocharger 24, which has a configuration equivalent to the configuration of the first turbocharger 22, is able to compress air sent out from the first intercooler 23 by using an exhaust gas. This compressed air has a high temperature in the same manner as described above. The high-temperature air is sent out through the air supply pipe 21c to the second intercooler 25.

The second intercooler 25, which has a configuration equivalent to the configuration of the first intercooler 23, cools the air sent out from the second turbocharger 24 by means of heat exchange between the air and the sea water. The air cooled by the second intercooler 25 is sent out through the air supply pipe 21d to an air supply manifold 28.

A common rail, fuel injectors, cylinders, and the like, are arranged in a cylinder head provided inside the top cover 10. The marine engine 1 is configured such that a compressed air supplied thereto is further compressed in the cylinder and then the fuel is injected so that a piston is moved up and down to thereby generate power.

As shown in FIG. 3, etc., the marine engine 1 includes a flywheel housing 62, an oil pan 63, and an oil filter 26.

The flywheel housing 62 is arranged in an end portion on the first turbocharger 22 side with respect to the crank axis direction. A transmission 71 is coupled to a flywheel provided in the flywheel housing 62 with interposition of, for example, a clutch (not shown). A propulsion unit of a ship, or the like, is coupled to the transmission 71. Thus, the output of the marine engine 1 can be transmitted to the propulsion unit or the like, and blocking of the transmission can be made.

The oil pan 63 is arranged on a surface (bottom surface) opposite to the top cover 10 with respect to the height direction. The oil pan 63 is a member for storage of an engine oil that is to be supplied to the inside of the engine (for example, to a component part included in a main drive system, such as the cylinder). The engine oil reserved in the oil pan 63 is sent out to the inside of the engine by means of an oil pump (not shown).

The engine oil sent out by the oil pump passes through the oil filter 26. As a result, metal powder, foreign substances, and the like, contained in the engine oil can be removed. In this embodiment, the oil filter 26 includes two filters (a full flow filter and a bypass filter).

Next, arrangement of the oil filter 26 and the devices included in the two-stage turbocharging system of this embodiment will be described from various aspects. In the following description, the devices (the first turbocharger 22, the first intercooler 23, the second turbocharger 24, and the second intercooler 25) included in the two-stage turbocharging system as well as the oil filter 26 may be collectively called "the turbochargers and the like".

Firstly, referring to a plan view (FIG. 2), arrangement of the turbochargers and the like in a plan view will be described. Since the thickness direction of the top cover 10 is parallel to the height direction as mentioned above, a plan view in this embodiment can be also regarded as "a view as seen in the thickness direction of the top cover 10".

The first turbocharger 22 is arranged in one end portion of the marine engine 1 with respect to the crank axis direction. All of the first intercooler 23, the second turbocharger 24, and the second intercooler 25 are arranged in one end portion of the marine engine 1 with respect to the device width direction. These three devices are arranged side by side with the first intercooler 23 located closer to the first turbocharger 22. The oil filter 26 is arranged in the other end portion (end portion opposite to the transmission 71 side) of the marine engine 1 with respect to the crank axis direction.

In this embodiment, the turbochargers and the like are arranged so as not to overlap one another. This enables an operator who is working on the top cover 10 when performing a maintenance operation to perform the maintenance operation without the need to remove other devices, thus achieving a layout that facilitates the operation.

In this embodiment, the turbochargers and the like are arranged so as to form a side surface of the marine engine 1. In other words, the turbochargers and the like are arranged so as to surround (more specifically, surround three of the four sides of) the top cover 10 in a plan view. This can limit the size of the marine engine 1 with respect to the device width direction.

The air supply manifold 28 is arranged in the other end portion (on the side opposite to the side where the first intercooler 23 and the like are located) of the marine engine 1 with respect to the device width direction.

Next, referring to a front elevational view (FIG. 3), the positions of the turbochargers and the like with respect to the height direction will be described. In this embodiment, an upper surface of the top cover 10 constitutes a part of an upper surface of the marine engine 1. A lower surface of the oil pan 63 constitutes a part of a lower surface of the marine engine 1. Accordingly, the distance from the lower surface of the oil pan 63 to the upper surface of the top cover 10 can be considered as the height of the marine engine 1. In the following, half the height of the marine engine 1 will be defined as "reference height", as shown in FIG. 3.

All of the turbochargers and the like are arranged higher (closer to the top cover 10) than the reference height. To be more specific, not only the upper ends of the turbochargers and the like but also middle portions and the lower ends thereof are located higher than the reference height. The first turbocharger 22, the first intercooler 23, and the second intercooler 25 are arranged with their upper surfaces being substantially identical to the upper surface of the marine engine 1.

Such a configuration in which the turbochargers and the like are arranged in an upper region of the marine engine 1 achieves a layout that allows an operator who is working on the top cover 10 in performing a maintenance operation to easily access the turbochargers and the like (the operation is facilitated).

Next, comparison among the lengths of the air supply pipes 21a to 21d will be given with reference to a perspective view showing the positional relationship among the devices of the air supply system (FIG. 4).

Here, the length of the air supply pipe 21a means the length of a path of air extending from the first turbocharger 22 to the first intercooler 23. The same applies to the other air supply pipes. Therefore, in this embodiment, comparison among the lengths of paths of air supplied to the cylinder can be given based on comparison among the lengths of the air supply pipes.

In this embodiment, the condition that "the length of the air supply pipe 21a<the length of the air supply pipe 21b" is established, and the condition that "the length of the air supply pipe 21c<the length of the air supply pipe 21d" is established.

This configuration enables the air supply pipe 21a and the air supply pipe 21c, through which high-temperature air passes, to be relatively short. Accordingly, parts of all the air supply pipes that need to be covered with a heat insulating material or the like can be shortened, which leads to cost reduction.

As thus far described, the marine engine 1 includes the first turbocharger 22, the first intercooler 23, the second turbocharger 24, the second intercooler 25, the oil filter 26, and the top cover 10. The first turbocharger 22, the first intercooler 23, the second turbocharger 24, the second intercooler 25, and the oil filter 26 are arranged so as not to overlap one another when seen in the thickness direction of the top cover 10.

Accordingly, the operator working on the top cover 10 in performing the maintenance operation has easy access to the oil filter 26, the turbochargers, and the like, which need relatively frequent maintenance operations. Thus, the facilitation of the maintenance operation can be improved.

In the marine engine 1 of this embodiment, the oil filter 26 is arranged in one end portion with respect to the crank axis direction, the one end portion being an end portion on the side opposite to the side where the transmission 71 is connected.

In a ship installed with the marine engine 1, there is often a relatively large space on the side opposite to the side where the transmission 71 is connected. The oil filter 26 can be arranged with effective use of the space. The presence of the space makes replacement of the oil filter 26 easy.

In the marine engine 1 of this embodiment, the first turbocharger 22 is arranged in an end portion on the transmission side. The first intercooler 23, the second turbocharger 24, and the second intercooler 25 are arranged side by side in the crank axis direction.

This makes it possible that the turbochargers and the like are positioned together to some extent, which can improve the facilitation of the maintenance operation in a case where the maintenance operation is performed sequentially on a plurality of the turbochargers and the like.

In the marine engine 1 of this embodiment, all of the first turbocharger 22, the first intercooler 23, the second turbocharger 24, the second intercooler 25, and the oil filter 26 are arranged higher than the reference height.

Since the turbochargers and the like are arranged in an upper region (near the top cover 10) of the marine engine 1, the maintenance operation can be further facilitated.

Although a preferred embodiment of the present invention has been described above, the above-described configuration can be modified, for example, as follows.

The layout shown above is merely illustrative, and may be changed as appropriate. For example, the positions of the flywheel housing 62 and the oil pan 63 may be changed in accordance with, for example, a required size or specifications. The positions of the devices included in the two-stage turbocharging system and the oil filter 26 may be also appropriately changed, as long as the positional relationship described above is satisfied.

The shapes of the air supply pipes 21a to 21d that connect the turbochargers and the like to one another are not limited to the above-described ones, and may be changed as appropriate in accordance with, for example, the position of another device.

The present invention is applicable to either main equipment or auxiliary equipment as long as it is a marine engine.

DESCRIPTION OF THE REFERENCE NUMERALS

1 marine engine
10 top cover (plate-like cover)
21a to 21d air supply pipe
22 first turbocharger
23 first intercooler
24 second turbocharger
25 second intercooler
26 oil filter
61 crankshaft

What is claimed is:

1. An engine, comprising:
    a first turbocharger that supplies air by using an exhaust gas;
    a first intercooler into which a gas having passed through the first turbocharger flows, the first intercooler cooling the gas whose temperature has been elevated in the first turbocharger;
    a second turbocharger into which a gas having passed through the first intercooler flows, the second turbocharger supplying air by using an exhaust gas;
    a second intercooler into which a gas having passed through the second turbocharger flows, the second intercooler cooling the gas whose temperature has been elevated in the second turbocharger;
    an oil filter that filters an engine oil; and
    a plate-like cover that covers a valve cover positioned above a cylinder head,
    wherein the first turbocharger, the first intercooler, the second turbocharger, the second intercooler, and the oil filter being arranged so as not to overlap one another in a crank axis direction,
    wherein the first intercooler, the second turbocharger, and the second intercooler are arranged side by side in the crank axis direction, and
    wherein all of the first intercooler, the second turbocharger, and the second intercooler are arranged in one end portion of the engine with respect to a device width direction.

2. The engine according to claim 1, wherein the oil filter is arranged in an end portion of the engine with respect to the crank axis direction, the end portion being opposite to a transmission-side end portion that is one end portion of the engine to which a transmission is connected.

3. The engine according to claim 2, wherein the first turbocharger is arranged in the transmission-side end portion.

4. The engine according to claim 1, further comprising an upper surface of the engine,
    wherein a surface of the plate-like cover defines at least a portion of the upper surface,
    wherein the height of the position of a bisector bisecting the distance between the upper surface and a bottom surface of the engine that is a surface thereof on the side opposite to the upper surface is defined as a reference height, and
    wherein all of the first turbocharger, the first intercooler, the second turbocharger, the second intercooler, and the oil filter, in their entirety, are arranged higher than the reference height.

* * * * *